United States Patent [19]

Cummins

[11] Patent Number: 4,937,861

[45] Date of Patent: Jun. 26, 1990

[54] COMPUTER SOFTWARE ENCRYPTION APPARATUS

[75] Inventor: Marty T. Cummins, Rochester, Mich.

[73] Assignee: Kelly Services, Inc., Troy, Mich.

[21] Appl. No.: 227,720

[22] Filed: Aug. 3, 1988

[51] Int. Cl.$^5$ .............................................. H04L 9/06
[52] U.S. Cl. .......................................... 380/2; 380/4; 380/25; 380/49; 380/50
[58] Field of Search ....................... 380/4, 25, 49, 50, 2

[56] References Cited

U.S. PATENT DOCUMENTS

| | | |
|---|---|---|
| 4,685,056 | 8/1987 | Barnsdale, Jr. et al. ................. 380/4 |
| 4,698,617 | 10/1987 | Bauer ...................................... 380/4 |
| 4,764,459 | 8/1988 | Watanabe et al. ....................... 380/4 |

FOREIGN PATENT DOCUMENTS

| | | |
|---|---|---|
| 60-206239 | 10/1985 | Japan . |
| 61-160126 | 7/1986 | Japan . |
| 61-261938 | 11/1986 | Japan . |

*Primary Examiner*—Salvatore Cangialosi
*Attorney, Agent, or Firm*—Harness, Dickey & Pierce

[57] ABSTRACT

Data security is provided using an encryption/decryption algorithm which attaches at the primitive BIOS level of the operating system automatically during the power-on self-test routines. The encryption/decryption process is implemented by intercepting the removable media or floppy diskette interrupt in order to add additional interrupt handling routing instructions which perform the encryption and decryption of data passed between the diskette controller and the data transfer buffer area within system RAM. Bitwise alteration of the data in a predefined relationship is used to encrypt and decrypt. The encryption/decryption system attaches before the computer power-up sequence renders data entry hardward active, hence the user cannot readily override the security system. Data stored on nonremovable media such as hard disk media is not encrypted, thereby preserving the integrity of more permanent data.

13 Claims, 8 Drawing Sheets

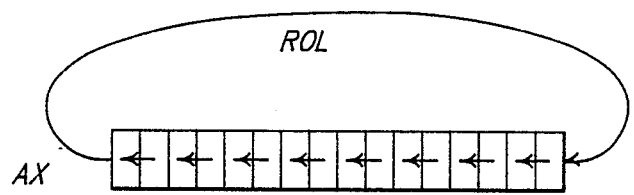
FIG. 9a.
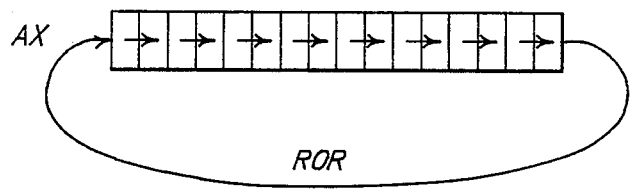
FIG. 9b.
Before
| 4 | | | | 1 | | | | 8 | | | | 2 | | | |
|---|---|---|---|---|---|---|---|---|---|---|---|---|---|---|---|
| 0 | 1 | 0 | 0 | 0 | 0 | 0 | 1 | 1 | 0 | 0 | 0 | 0 | 0 | 1 | 0 | = Ae′
FIG. 9c.
After ROL
| 8 | | | | 3 | | | | 0 | | | | 4 | | | |
|---|---|---|---|---|---|---|---|---|---|---|---|---|---|---|---|
| 1 | 0 | 0 | 0 | 0 | 0 | 1 | 1 | 0 | 0 | 0 | 0 | 0 | 1 | 0 | 0 | = â♦
FIG. 9d.
After ROR
| 4 | | | | 1 | | | | 8 | | | | 2 | | | |
|---|---|---|---|---|---|---|---|---|---|---|---|---|---|---|---|
| 0 | 1 | 0 | 0 | 0 | 0 | 0 | 1 | 1 | 0 | 0 | 0 | 0 | 0 | 1 | 0 | = Ae′
FIG. 9e.

COMPUTER SOFTWARE ENCRYPTION APPARATUS

BACKGROUND AND SUMMARY OF THE INVENTION

The present invention relates generally to data security for computer systems. More particularly, the invention relates to an encryption apparatus which is automatically invoked during the computer system power-on routine and which automatically intercepts and encrypts data being written to removable data storage media. A complementary decryption procedure is automatically invoked when data is read from the removable data storage medium. The encryption apparatus thus discourages the taking of data from the computer system by copying it onto a removable medium for use on a different computer system without decryption capabilities.

Computer data is often stored on nonvolatile read/write media such as magnetic disks, optical disks, magnetic tape, and the like. Many popular computer systems of today use both fixed data storage media, which cannot be readily removed from the system by the user, and removable media, which are intended to be removed from the system by the user. For example, many popular microcomputer and minicomputer systems have nonremovable fixed disk or hard disk drives and removable floppy diskette drives.

Data is frequently stored on nonvolatile read/write media as records or files, which provide a degree of organization to assist in locating and retrieving the stored data. The manner of storage as records or files can be unique to a particular make and model of computer system hardware, or it can be standardized to be compatible with other makes and models of computer system hardware. The latter allows one to transfer data from one computer system to another compatible computer system by simply writing the data onto a removable medium, such as a floppy diskette, removing the diskette to the other computer system and then reading the data from the diskette.

With the proliferation of affordable compatible computer systems, the ability to share data in this fashion represents a significant security problem to businesses which store and process confidential and proprietary information using computer systems having the capability to support removable media. For example, a business might store confidential or proprietary information on its computer system fixed disk or hard disk, where the information can simply copied onto a floppy diskette and removed from the premises.

A number of different security measures have been contemplated to combat this problem, although many such measures make it more difficult for users who use these systems on a daily basis. Also, incompatibilities with different types of application software products frequently arise when security systems are in place. This can render the computer system inoperative or unreliable.

Part of the compatibility problem can be attributed to the fact that there is presently less than adequate standardization in the manner in which application programs interface with the computer system's underlying operating system. The operating system provides an environment in which the application program runs. Application programs are thus written to interface with the operating system, with the desire that the workings of the operating system will be transparent to the user. However, many conventional security systems alter the manner in which application programs interface with the operating system environment. This can lead to compatibility problems. The risk of encountering compatibility problems with conventional security systems in place is considerable, particularly since it is often not feasible to test all available application programs which a user may wish to run under the operating system environment. As an example, a conventional security system may work properly for a particular spreadsheet program, but may intermittently and unexpectedly corrupt the data produced by a particular word processing or accounting program. This is clearly undesirable.

The present invention overcomes the limitations and compatibility problems of conventional security systems by providing a security system which automatically encrypts all data written to removable media, and which similarly decrypts all data read from that media. The invention works in a way which is completely transparent to the user and to the application program. The invention may be implemented without requiring use of passwords. This is a decided advantage, since password security is only as reliable as the persons having knowledge of the password. The invention is capable of being implemented on both stand alone and networked computer systems.

Rather than attaching to the computer system software at the disk operating system level as many conventional data security systems do, the invention attaches to the more primitive, computer hardware specific BIOS or Basic Input Output System level. Attaching to the computer system at the BIOS level, the invention must be implemented with a particular computer system hardware in mind. This has advantages over the conventional approach of attaching at the higher disk operating system or DOS level, where compatibility with a plethora of application programs must be kept in mind.

The invention provides a data security system for a computer system having a fixed data storage medium, a removable data storage medium and a buffer area for communicating with the fixed and removable data storage media. The security system comprises a security means communicating with the buffer area for automatically intercepting and encrypting data flowing from the buffer area to the removable data storage medium without intercepting and encrypting data flowing from the buffer area to the fixed data storage medium.

In a presently preferred environment, the computer system has a processor for operating on data comprising arrangements of binary digits. The computer system has a power-on routine for causing the processor to scan a predetermined range of memory location addresses for instructions after power-on. The system includes a means for enabling the processor to communicate with the data storage media comprising program means for reading and writing data to a fixed data storage medium and to a removable data storage medium. The data security system of the invention comprises a security program disposed within the predetermined range of memory location addresses scanned by the power-on routine. The security program attaches itself at the BIOS level during the power-on routine and automatically alters the program means for reading and writing data to the removable data storage medium. The security program is capable of transforming data communicated between at least one of the fixed and removable data storage media and the processor. The transformation is conducted so that data stored on the one data storage media is represented using a different arrangement of binary digits than is used when the data is operated upon by the processor. Because the data is stored in a different arrangement of binary digits, the data will be virtually unintelligible when operated upon by a processor in a computer system which does not have the invention's decryption capability.

Further, the security system of the invention may be used in a computer system having a file storage structure for storing data as individual files on different portions of a removable data storage medium. The structure may include a file allocation table containing information for correlating the individual files with selected different portions of the medium. The security system comprises a means for encrypting and storing the file allocation information on the removable data storage medium. The invention further comprises a means, nonremovably associated with the computer system, for decrypting and using the information to correlate individual files with the selected portions of the medium, thereby permitting location and retrieval of data stored as files on the medium by the computer system.

For a more complete understanding of the invention, its objects and advantages, reference may be had to the following specification and to the accompanying drawings.

BRIEF DESCRIPTION OF THE DRAWINGS

FIG. 6 is a flow chart diagram of an interrupt routine for implementing the security system of the invention;

FIGS. 9a-9e comprise a series of memory register diagrams useful in understanding the encryption and decryption algorithms described in FIGS. 7 and 8;

DESCRIPTION OF THE PREFERRED EMBODIMENT

Figure 1:
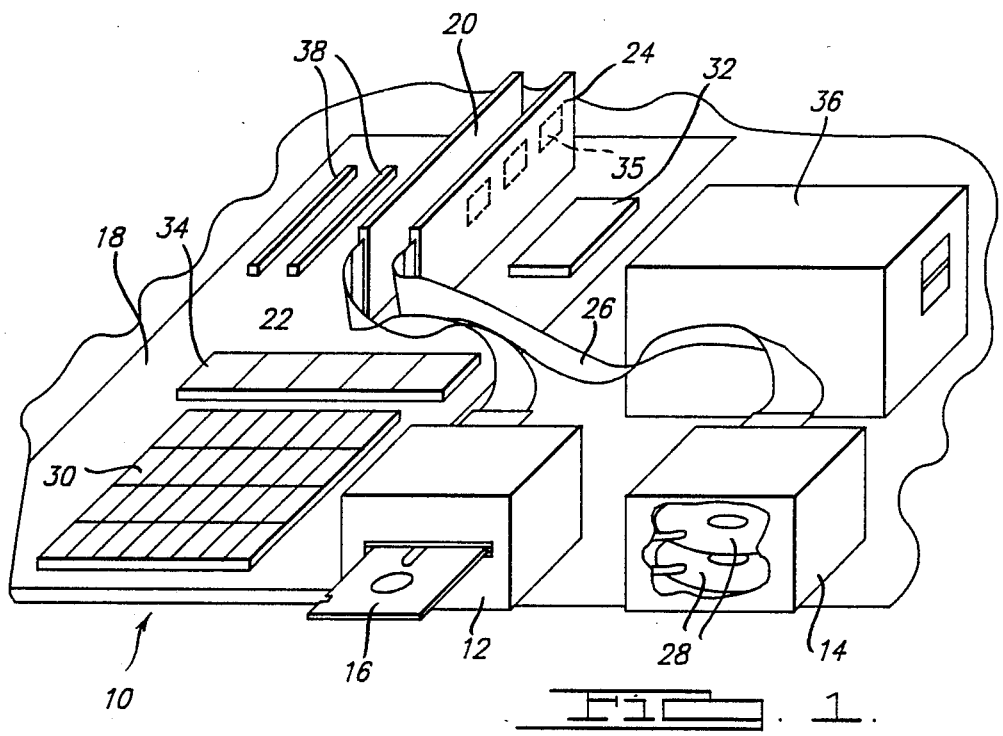
FIG. 1 is a perspective view of a microcomputer on which the invention may be implemented.

With reference to FIG. 1, a computer system similar to the IBM PC/XT is illustrated generally at 10. The particular arrangement and identity of computer system components has been selected to aid in understanding the invention and is not intended to be a limitation upon the scope of the invention as set forth in the appended claims. Computer system 10 includes removable media storage system 12, such as a floppy diskette drive and a nonremovable or fixed media storage system 14, such as a Winchester hard disk drive. The removable media storage system is adapted to read and write upon removable floppy diskettes such as diskette 16. Floppy diskette drive 12 communicates with the computer system mother board 18 via the floppy diskette controller card 20 which is connected to the drive 12 by a ribbon cable 22. The hard disk drive 14 communicates with mother board 18 via hard disk controller card 24. The hard disk controller card and hard disk drive are connected by a ribbon cable 26. In contrast with the removable floppy diskette media 16 of floppy drive 12, the magnetic media platters 28 of hard drive 14 are permanently and hermetically sealed within the drive unit and are not intended to be removed by the user.

Computer system 10 further comprises a block of random access memory or RAM 30 attached to mother board 18. At the heart of the computer system is microprocessor 32 which is attached to the mother board and which communicates with the various other systems on the mother board and with the disk drive controllers by means of a bus (not shown). The computer system further includes a block of read only memory or ROM 34 on which certain basic input and output routines or program instructions are permanently stored. These routines are used by microprocessor 32 to perform basic computer functions such as reading and writing data to the removable and nonremovable media. Power is supplied to the mother board and to the disk drive units by power supply 36. In addition to the system ROM 34 on the mother board, computer system 10 may include additional ROM 35 on the controller cards such as the hard disk controller card 24. Typically, such additional ROM is used to provide additional program instruction routines needed to operate particular hardware associated with a particular card. This allows additional features and capabilities to be added to the computer system without changing the system ROM 34 on the mother board, simply by plugging in additional cards into connectors or slots which communicate with the bus on the mother board. Two vacant slots 38 are illustrated in FIG. 1.

For a better understanding of the invention, some further explanation of a conventional computer system architecture may be helpful. In order to better illustrate the invention, certain aspects of the IBM PC/XT will now be described. Also, for purposes of illustration, it will be assumed that the IBM PC/XT computer system is using a PC-DOS or MS-DOS operating system. Of course, the invention can be implemented with other computer systems and with other operating systems.

Figure 2:
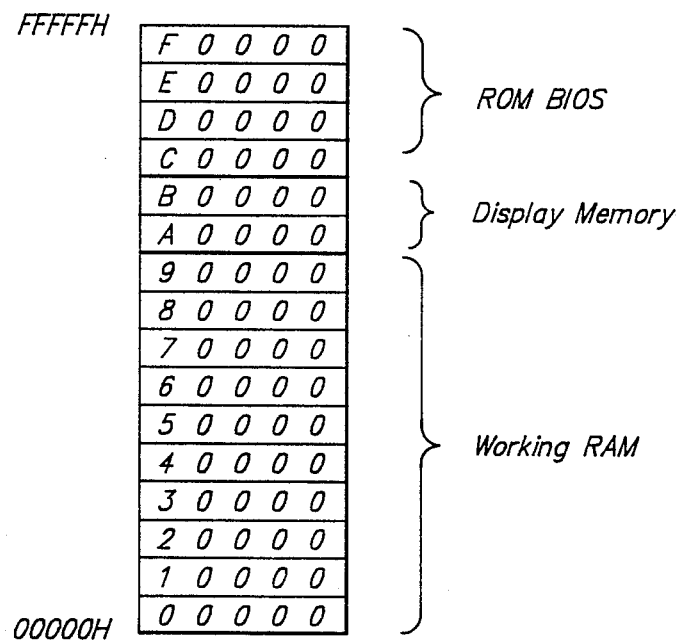
FIG. 2 is an exemplary memory map diagram of the microcomputer of FIG. 1, useful in understanding the invention.

Referring to FIG. 2, a schematic memory map of the IBM PC/XT computer system is depicted. The IBM PC/XT computer of this example uses an 8088 Intel microprocessor, which is a 16 bit microprocessor in the Intel family of microprocessors which also includes the 8086, the 80286 and 80386. The invention can be implemented using any of these microprocessors as well as the microprocessors of other manufacturers.

The 8088 Intel microprocessor is capable of addressing 1 megabyte of memory. To address this memory a 20 bit numeric address comprised of a segment value and an offset value is used for each byte. According to conventional nomenclature, the 20 bit numeric address can be represented using a 5 hexadecimal digit equivalent. Thus the 1 megabyte memory space may be addressed using values ranging from hex 00000 to hex FFFFF.

As shown in FIG. 2, the 1 megabyte memory space is mapped into different regions dedicated to specific functions. The space from 00000 through 9FFFF comprises the working RAM space into which application programs can be loaded and run. The space from A0000 through BFFFF is reserved for video display memory. The space from C0000 through FFFFF is set aside for ROM memory containing the basic input/output system or BIOS, the power-on self-test or POST routines and other primitive operating routines. Further details of the system architecture can be found in such sources as the IBM Technical Reference for the PC/XT.

Figure 3:
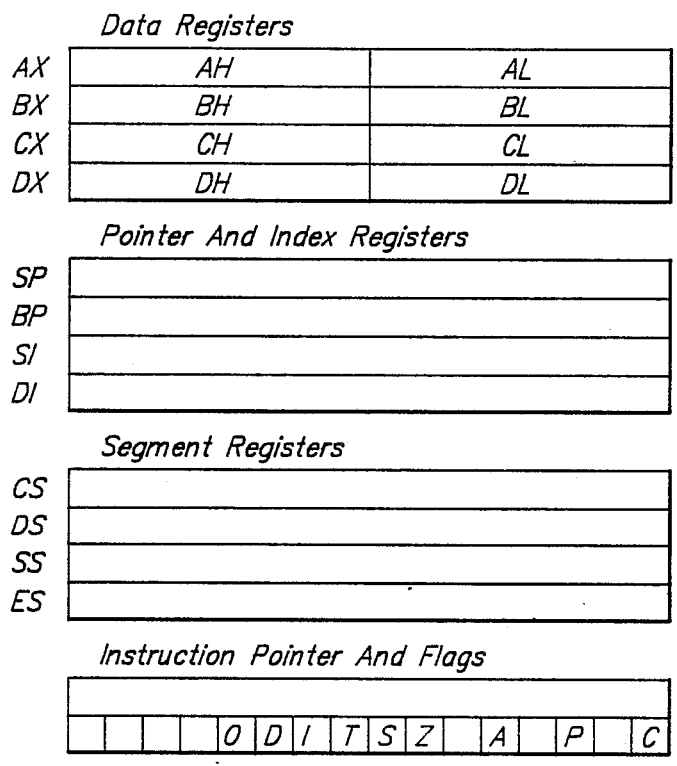
FIG. 3 is a schematic diagram describing an exemplary microprocessor architecture useful in understanding the invention.

The 8088 microprocessor used in the IBM PC/XT employs a number of 16 bit registers which have been diagrammatically represented in FIG. 3. The chip architecture includes four 16 bit data registers AX, BX, CX and DX; four 16 bit pointer and index registers SP, BP, SI and DI; four 16 bit segment registers CS, DS, SS and ES; a 16 bit instruction pointer IP and a 16 bit flags register. For more information on the register architecture of the 8088 microprocessor, reference may be had to the 8086 book by Rector and Alexy, Osbourne/McGraw-Hill. Information can also be obtained from Inter Corporation, 3065 Bowers Avenue, Santa Clara, Calif. 95051.

Figure 4:
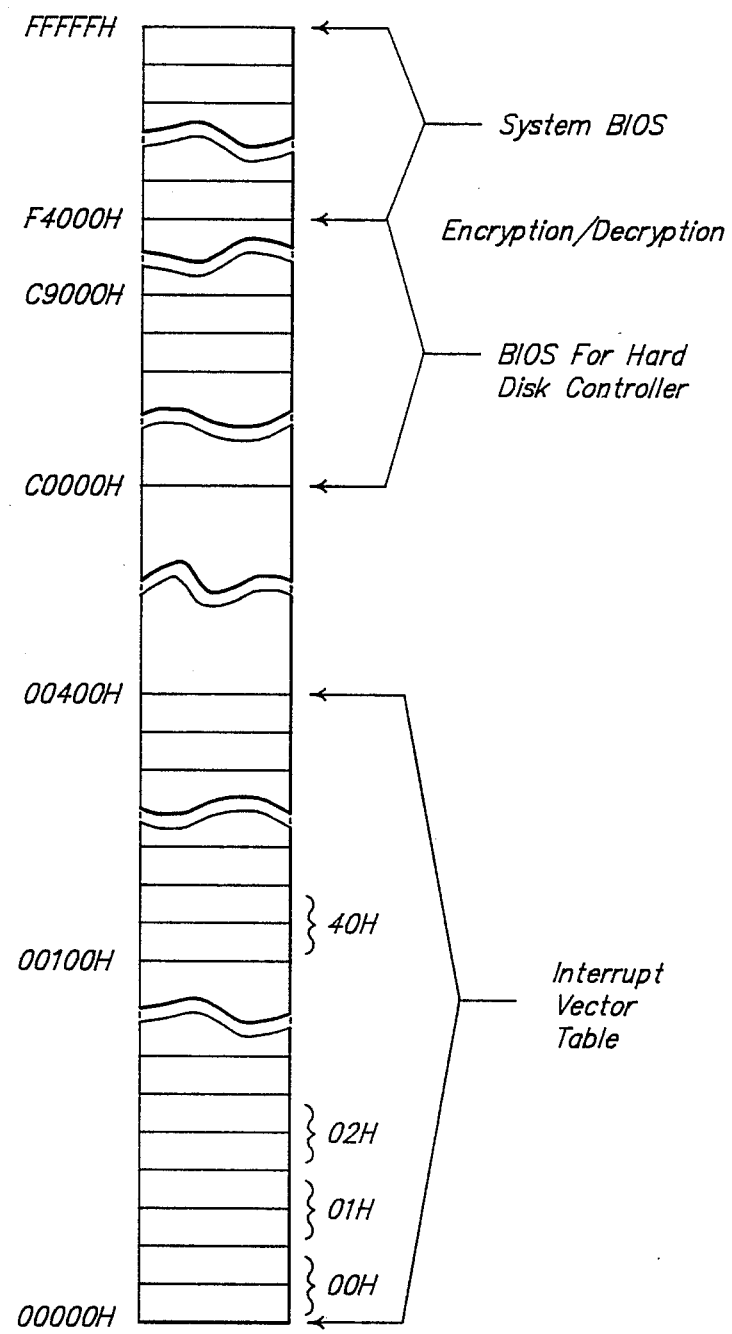
FIG. 4 is a detailed memory map diagram useful in understanding the invention.
Figure 5:
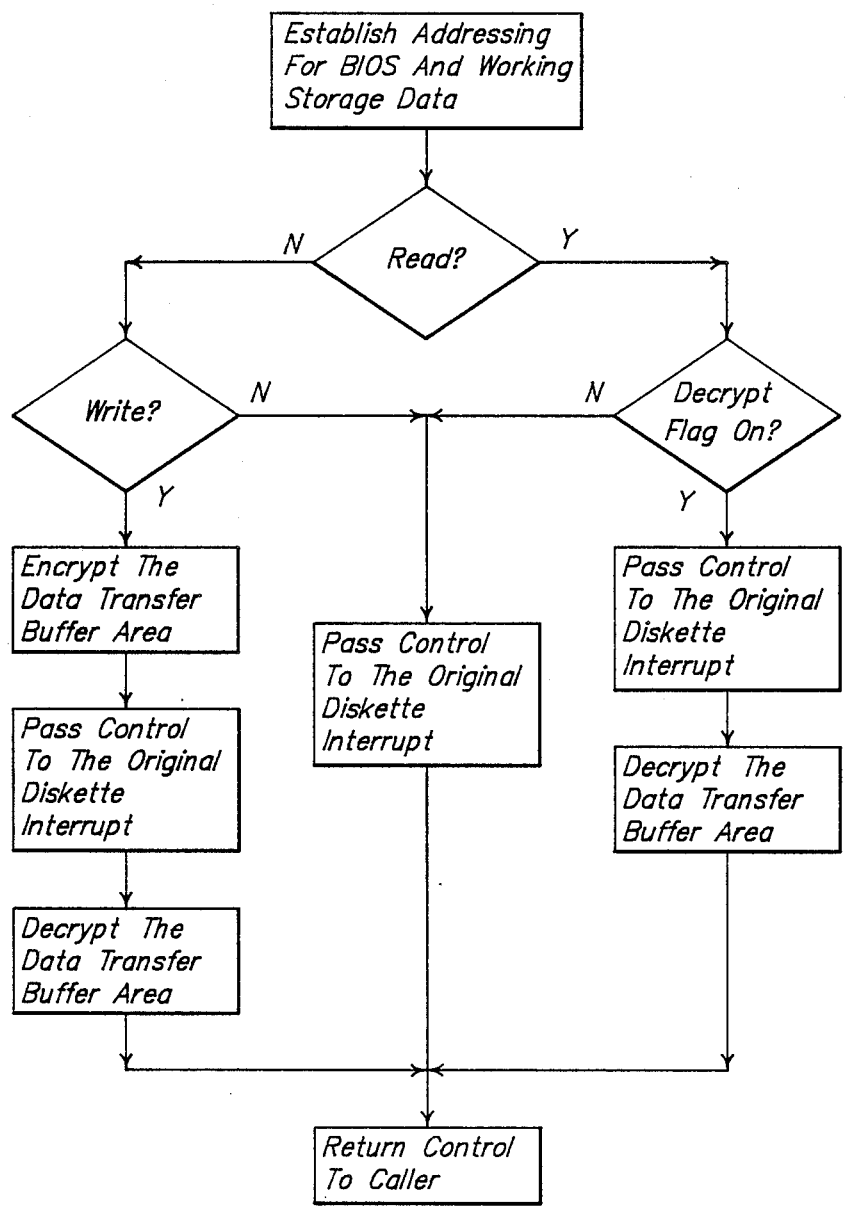

As shown in the more detailed memory map of FIG. 4, the ROM BIOS space comprises a portion ranging from F4000 to FFFFF which constitutes the system BIOS. This BIOS physically resides on ROM 34 on the mother board. Included in this system BIOS are the routines which instruct the microprocessor in causing the floppy diskette drive to perform read and write functions. The BIOS memory space further comprises a portion from C0000 through F4FFF which constitutes the BIOS routines for operating the hard disk controller. Part of this memory space is actually occupied by ROM chips on the hard disk controller card 24. The remainder of this memory space reserved for hard disk controller purposes is conventionally left vacant. Empty chip sockets may be provided on the hard disk controller card corresponding to these vacant locations. As will be more fully explained below, the invention utilizes this vacant BIOS memory space in order to provide the encryption and decryption functions of the invention. In the presently preferred embodiment for the IBM PC/XT the encryption/decryption routines reside in the BIOS ROM space at C9000.

At the other extreme end or low memory end of the memory map from 00000 through 00400 is the interrupt vector table residing in RAM. The interrupt vector table comprises a series of jump addresses in the form of segment values and offset values which tell the microprocessor where the particular instructions for a particular interrupt service handling routine may be found. Because the interrupt vector table resides in RAM, the vector jump addresses can be changed in order to substitute different routines for the routines conventionally provided. The present invention takes advantage of this feature by replacing the interrupt 40H floppy diskette controller routine with a new, augmented routine providing automatic encryption and decryption.

The present invention takes control of the computer during power-up and changes the information stored in the vector table corresponding to floppy diskette controller routine, interrupt 40H. The vector table is changed so that the interrupt 40H jump address or vector address points to a different floppy diskette handling routine which provides automatic encryption and decryption. Interrupt 40H is revectored during the automatic power-up sequence, preferably during the power-on self-test or POST routine, during which time the user cannot interact with the computer to abort the revectoring sequence. By revectoring the floppy diskette controller routines at an early stage in the power-up sequence, the invention insures that encryption and decryption facilities are always installed and operating by the time the user can interact with the computer.

The 8088 microprocessor used in the IBM PC/XT automatically looks to high memory address FFFFF for its first operating instruction. The instruction at this high memory ROM address is a jump instruction to the beginning of the reset routine. During or following the reset routine a series of power-on self-test (POST) routines are run. These routines are run before external input/output devices are initialized and activated. Hence the user cannot communicate with the microprocessor during power-on self-test.

One of the POST routines checks to see if optional ROM has been installed in the C8000 through F4000 memory space. It will be recalled that this memory space comprises ROM space reserved for the hard disk controller card BIOS routines. This power-on self-test routine scans the ROM space in the C8000 through F4000 range in 2K blocks. In accordance with the standards adopted for the IBM PC/XT, a valid module within this ROM space has "55AA" in the first two locations of the block, with a length indicator in the third location. The length indicator is the code size of the module in bytes divided by 512. The code for the module begins in the fourth location.

The IBM PC/XT has a hard disk controller and thus uses a portion of the optional ROM space for its hard disk controller routines. The present invention adds additional code within the optional ROM space for the purpose of revectoring the floppy diskette interrupt handling routine and for providing routines which perform the encryption and decryption of data written to and read from the floppy diskette media. This additional code is added at unused addresses within the optional ROM space. If desired, the code may be added to the end of the existing hard disk controller BIOS, so that it forms a contiguous part of the module residing in the optional ROM space from C8000 through F4000. If this is done, care must be taken to decrease the length indicator in the third location at the beginning of the module, so that the microprocessor POST routines will scan the added code during the next scan cycle. For example, if the first three locations of the hard disk controller module contain 55 AA 10, and it is desired to add an additional two blocks of 512 bytes, then the first three locations should be made to read as follows, 55 AA 0E. Since the first three locations reside in ROM, it will be necessary to program a new EPROM or ROM in order to change the third location value from 10 to 0E and the checksum byte to an appropriate value.

When implementing the invention on an IBM PC/XT or like compatibles, the additional code required to implement the invention can reside at the C900 segment on the hard disk BIOS ROM. When implementing the invention on an IBM AT, the code may reside in optional ROM at the E000 segment. The mother board on the IBM PC/AT has an empty ROM socket which may be used to install the additional code. In the alternative, if the appropriate empty socket is not provided, the additional code can be installed on cards for insertion into one of the available expansion slots on the mother board. Of course, the address chosen for the additional code should not conflict with existing BIOS code within the system.

As will be explained more fully below, the presently preferred encryption and decryption algorithms operate upon the data being written to and being read from the floppy diskette media but not upon data being written to and read from the hard disk media. Floppy diskette read and write requests (interrupt 40H) are intercepted at the BIOS level so that the appropriate encryption or decryption can be performed before (in the case of a write) or after (in the case of a read) control is passed to the original floppy diskette BIOS routine. In order to intercept read and write requests at the BIOS level, the invention revectors the interrupt 40 routine by changing the address pointed to in the vector table corresponding to interrupt 40H. Because the 8088 microprocessor requires a 16 bit segment and a 16 bit offset in order to define the 20 bit address within the memory space, each interrupt vector within the vector table requires two 16 bit words (comprising a segment value and an offset value) to define the vector jump location or pointer. Accordingly, interrupt 40H corresponds to an offset of 100H from the bottom of memory. See FIG. 4 where interrupt 40H is designated beginning at address location 00100H.

Figure 5:
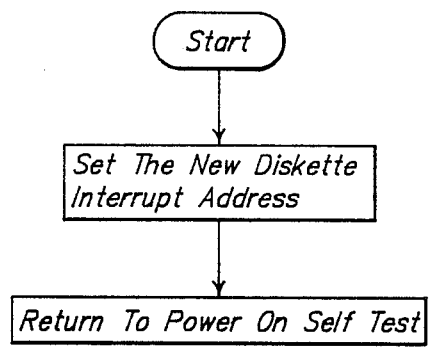
FIG. 5 is a flow chart diagram depicting an algorithm for incorporating the data security system in an exemplary microcomputer.

The steps for adding the encryption and decryption routines by means of the power-on self-test are illustrated in FIG. 5. As explained above, the power-on self-test routine includes a routine which scans the optional ROM space and performs checksum tests on any optional ROM modules found in the optional ROM space. If the checksum is correct, the power-on self-test routine calls the optional ROM modules, temporarily passing control to those modules. It is by this mechanism that the invention takes control of the microprocessor during the power-on sequence in order to revector the floppy diskette interrupt handling routine and in order to reserve the required RAM space used by the encryption and decryption algorithms. More complete details of the power-on self-test routines and in particular the routines for scanning and performing checksum tests can be found in the IBM Technical Reference for the IBM PC/XT.

The presently preferred initialization routine depicted in FIG. 5 sets the new diskette interrupt address and then returns control to the power-on self-test (POST) routine. The original diskette interrupt address may be determined and stored as a variable within the working storage space. In the presently preferred embodiment the interrupt address of the original diskette interrupt is found at segment 0F000 offset EC59 hexadecimal. This address can be determined by consulting the interrupt vector table prior to the revectoring process or the value may be determined in advance and hard coded into the initialization routine. The presently preferred embodiment employs the latter approach, as hard coding of the original diskette routine address has proven to be somewhat more reliable and does not require storing the original diskette interrupt address as a variable. The hard address of the original diskette routine may be found by consulting the ROM BIOS listing for the computer system on which the invention is to be implemented. In the alternative, the hard address can be determined by a memory dump of the appropriate portion of the interrupt vector table of the computer system on which the invention is to be implemented.

Next the address of the new diskette interrupt routine (which includes the encryption and decryption algorithm) is written to the interrupt vector table. On the IBM PC/XT, the offset of the new routine is written at 00100H and the segment is written at 00102H. A decryption flag defined within the 1K working storage space is next set to ON. This flag may be used with auxiliary programs to allow the computer system modified in accordance with the invention to temporarily bypass the encryption and decryption capabilities as may be needed to list directories of nonencrypted diskettes or to copy nonencrypted files to the computer system hard disk, for example. Following the revectoring steps, control is returned to the power-on self-test which then proceeds to completion as usual.

The modified floppy diskette interrupt handling routine is shown in FIG. 6. After establishing addressability of the original BIOS diskette routine and the working storage data, the routine tests to determine if the interrupt request is for a read or for a write. If the request is for a read and if the decryption flag is set, control is passed to the original diskette interrupt routine which may be located using the hard address previously determined. The original diskette routine reads data from the diskette and writes it to a data transfer buffer located in the working RAM space. Before control is returned to the disk operating system, however, the modified diskette interrupt routine performs a decryption procedure on the buffer area. Control is then returned to the calling program, which is typically the disk operating system or possibly an application program making diskette read requests directly through the BIOS level.

If the decryption flag is not set, the original diskette interrupt routine is used to read data from the diskette and place it in the buffer, whereupon control is returned to the calling program without decryption.

If the request is to write data to the diskette, the data waiting in the data transfer buffer is first encrypted by the encryption algorithm discussed below. Thereafter, control is passed to the original diskette interrupt handling routine which causes the now encrypted data to be written to the diskette. Before passing control back to the calling program the buffer area, now containing encrypted data, is now decrypted so that it exists once again in the original nonencrypted state. This is done to insure that any further use of the buffered data by the computer will not be affected by the encryption procedure.

Figures 7, 8:
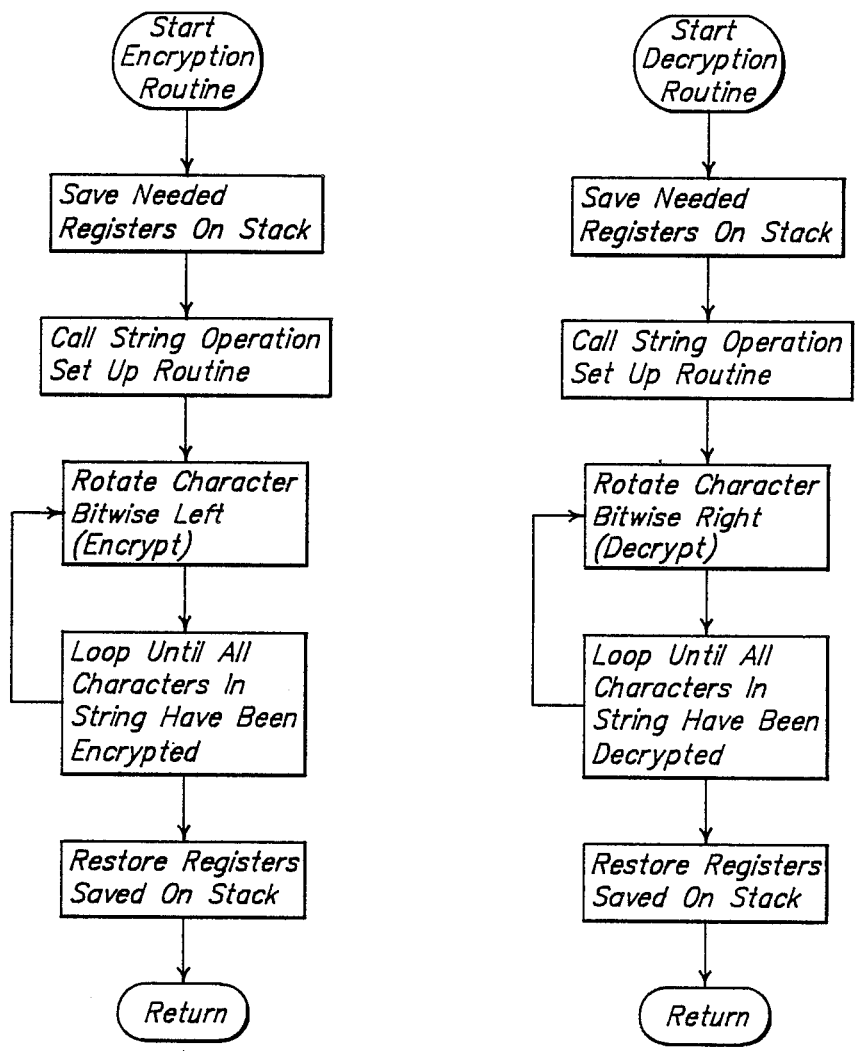
FIG. 7 is a more detailed flow chart depicting an ecryption routine useful in practicing the invention.
FIG. 8 is a similar flow chart routine depicting an decryption routine useful in practicing the invention.

The encryption and decryption algorithms of the presently preferred embodiment are illustrated in FIGS. 7 and 8, respectively. The presently preferred encryption and decryption algorithms use a simple but effective technique which alters the bit pattern of each character stored on the diskette using a bitwise rotate operation. The rotate operation is performed in a microprocessor data register using two clock cycles. The rotate operation is thus quite fast.

Referring first to FIG. 7, the encryption routine begins by saving all registers used by the routine on the stack. The stack is a first in, last out data structure maintained automatically by the computer system in a portion of the working RAM for temporary storage. Both the encryption routine and the decryption routine operate upon characters stored in the data transfer buffer using string manipulation instructions of the microprocessor. To use these string manipulation functions, the microprocessor must have the size of the data block to be operated upon as well as the starting location of the disk transfer buffer. In the presently preferred embodiment these starting requirements are needed for both encryption and decryption and therefore a string operation setup routine may be implemented and shared for both encryption and decryption routines.

Figure 10:
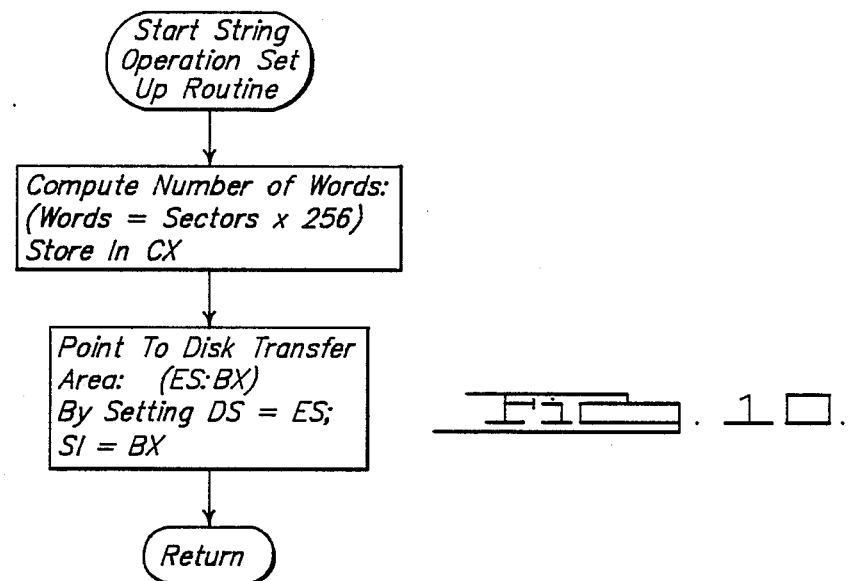
FIG. 10 is a string setup routine used by the routines of FIGS. 7 and 8.

FIG. 10 describes the string operation setup routine. This routine simply computes the number of words in the buffer to be operated upon. Diskette read and write operations which utilize the interrupt 40H routine place the number of sectors to be written in the AL register. (The AL register is the lower eight bit half of the AX register illustrated in FIG. 3.) Thus the number of words to be operated upon can be computed by multiplying the number of sectors in the AL register by 256. This value is then stored in the CX register to be used as the count in subsequent loop operations. Next the beginning of the data transfer buffer is pointed to by setting the DS register equal to the ES register and by setting the SI register equal to the BX register. Read and write operations using interrupt 40H ordinarily presume that the address of the buffer is in the ES segment at a BX offset. After performing these setup routines, control returns to the calling encryption or decryption routine.

Returning now to FIG. 7, having called the string operation setup routine, the encryption routine now rotates each word (comprising two characters per word) in the string bitwise 1 bit to the left. This procedure continues upon each word in a loop controlled by the decrementing count in the CX register until all words in the string have been encrypted. After the entire string of characters has been encrypted, the registers previously saved on the stack are restored and control then returns to the modified interrupt handling routine of FIG. 6.

The decryption algorithm is quite similar to the encryption algorithm and is shown in the flow chart of FIG. 8. As before, the first step is to save all needed registers on the stack and then to call the string operation setup routine. Next the decryption routine enters a loop controlled by the count in the CX register. While in the loop each individual word within the string comprising the data to be decrypted in the data transfer buffer is rotated bitwise 1 bit to the right. This operation has the opposite effect to that of the leftwise rotation used in the encryption routine. The decryption routine thus reverses the effect of the encryption routine and returns the characters to their original unencrypted state. After the entire string has been operated upon in this fashion, the registers saved on the stack are restored whereupon control returns to the modified diskette interrupt routine.

FIG. 9 illustrates the manner in which the bitwise left rotation and bitwise right rotation are performed. As illustrated in FIG. 9a, the rotate left instruction ROL moves each bit of the 16 bit AX register 1 position to the left, with the leftmost bit moving to the rightmost location as illustrated in FIG. 9b, the rotate right instruction ROR does the opposite. It moves each bit of the 16 bit AX register 1 bit to the right with the rightmost bit moving to the leftmost bit position. FIGS. 9c, 9d and 9e give an example of how the binary digits or bits of the character "A" appear before any rotation operation (FIG. 9c); after the rotate left instruction (FIG. 9d) and then after the rotate right instruction (FIG. 9e). For purposes of illustration, the ASCII representation of "A" is shown in its binary form. After rotation to the left, the bit pattern of FIG. 9d now becomes that of the letter "e'," hence the original letter "A" is no longer intelligible. After a rotation right is performed on the bit pattern of FIG. 9d, the original ASCII representation of letter "A" is restored in FIG. 9e. The standard ASCII character set is coded from 7 bits. The extended ASCII character set is coded from 8 bits. Because the AX register is a 16 bit register, 2 characters can be stored in the AX register at a single time. The rotate right instruction ROR and the rotate left instruction ROL nevertheless operate on the entire 16 bit register. Thus the encryption of a given character (occupying either the upper or lower 8 bits of the AX register) will depend on what character is stored in the adjacent 8 bit portion. This has the advantage of encrypting the text string so that one having a copy of the nonencoded text string cannot readily create a translation table by comparing with a copy of the encrypted version.

The simple bitwise rotation algorithm for encrypting and decrypting data is presently preferred for its speed. Bitwise rotation operations are performed in two microprocessor clock cycles. Of course, other algorithms can be substituted for the bitwise rotation algorithms. If desired one may employ encryption schemes offering many different possible combinations of algorithms so that the odds of two parties algorithms being unintentionally the same can be quite high.

By altering all characters transferred via the BIOS interrupt 40H routine, the invention encrypts not only user data but also the file allocation table data and directory designations. This renders an encoded diskette quite secure against unauthorized access. A diskette encrypted using the invention will not provide a readily readable directory listing under conventional disk operating system commands. Each file on the diskette would be stored under an encrypted file name. Moreover, the file allocation table (FAT) which is used by the operating system to locate the sectors of the diskette medium on which a particular file is located is also encrypted. Hence, the operating system without help from the decryption process cannot even identify which sectors are associated with a given file.

Because the decryption algorithm is automatically invoked each time an interrupt 40H diskette read routine is performed, a computer equipped with the invention will not list the directory of a nonencrypted diskette using the conventional disk operating system directory listing routine. Furthermore, a computer equipped with the invention will not permit a nonencrypted diskette file to be copied onto the computer system hard disk due to the manner in which the read operation scrambles the data during decryption. Accordingly, the invention provides additional directory listing and file copying routines which may be used as substitute routines for those provided by the disk operating system.

Figure 11:
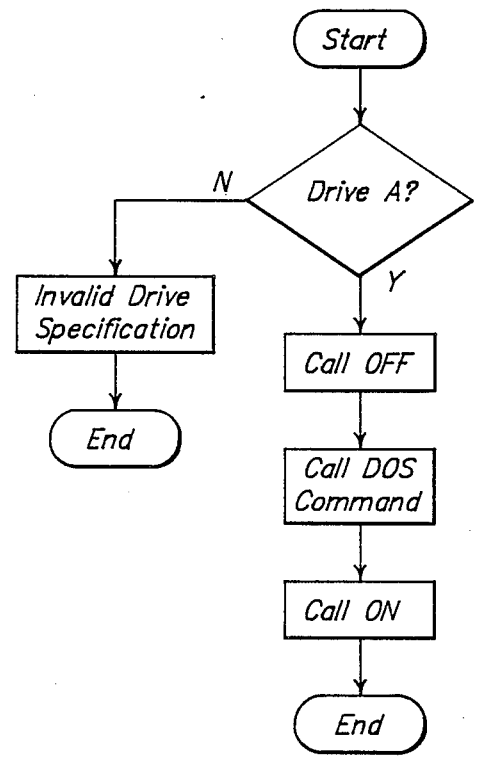
FIG. 11 is a flow chart illustrating the manner in which nonencrypted diskettes may be accessed when using the invention.

FIG. 11 describes the algorithm with may be used to implement the additional directory and file copy routines, the algorithm being essentially the same for both. The routine starts by testing to determine that the user wishes to employ the directory or copy routine via the floppy diskette drive, as opposed to the hard disk drive. Typically, the diskette drive A is treated as a floppy diskette drive in the IBM PC/XT, for example. If the directory listing or file copy command is applicable to a different drive, such as the hard disk drive, then the routine gives an Invalid Drive Specification error message and ends, returning control to the disk operating system command processor. On the other hand, if the drive is properly specified as the floppy diskette drive, the algorithm calls the OFF routine which temporarily revectors the interrupt 40H diskette drive handling routine to the original BIOS routine (without encryption/decryption). Next the appropriate directory of file copy program is called to implement the desired procedure. For example, if a directory listing is required, then the disk operating system DIR command is called. If a file copy operation is required, the disk operating system COPY is called. After the disk operating system command has executed, the algorithm continues by calling the ON routine, which revectors the interrupt 40H handling routine to the modified routine (with encryption/decryption) and the algorithm then ends, returning control to the command processor.

When implementing the invention on an IBM PC/XT, the ON routine may be a short assembly language program which writes 07AH to the interrupt 40H offset address 00100H and by writing the value 0C900H to the interrupt 40H segment address at address location 00102H. The OFF routine is similar but instead writes the value 0EC59H to the offset location and 0F000H to the segment location.

Figure 12:
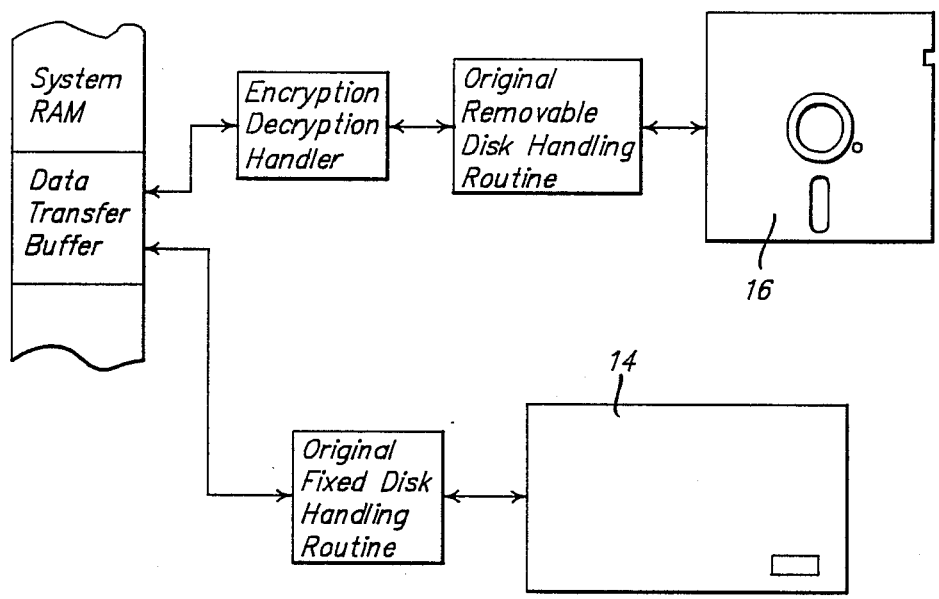
FIG. 12 is a data flow diagram illustrating the invention in operation.

As diagrammatically depicted in FIG. 12, the invention alters the data flow between the data transfer buffer and the removable data storage medium. The data transfer buffer is a block of memory residing in system RAM which contains the data to be written to the storage media and which receives data read from the storage media. As illustrated in FIG. 12, both the floppy diskette media 16 and the hard disk media 14 pass data to and from the data transfer buffer. Although in FIG. 12 the data transfer buffer is commonly shared by both floppy diskette and hard disk media, it is possible to construct a computer system in which separate data transfer buffers are used for each storage medium.

As illustrated, communication of data between the data transfer buffer and hard disk 14 is handled by the original fixed disk handling routine provided by the computer system BIOS. With the invention implemented, communication between the data transfer buffer and the floppy diskette medium is handled by both the encryption and decryption algorithms of the invention as discussed above and also by the original removable diskette handling routines provided by the computer system BIOS. In accordance with the flow chart of FIG. 6, the encryption and decryption routines selectively perform encryption and decryption functions and then pass control to the original removable diskette handling routine.

The presently preferred embodiment operates directly upon the data in the data transfer buffer and in practice the data transfer buffer can be the same memory space utilized as the data transfer area or DTA which is accessed by the removable diskette interrupt handling routine (interrupt 40H in the IBM PC/XT). Of course, if desired, the invention can be implemented in a fashion where the actual encryption and decryption operations are performed on copies of the data stored in the data transfer area and by then using BIOS function calls to redefine the location of the data transfer area to be the buffer containing the encrypted or decrypted data.

From the foregoing it will be seen that the present invention provides an encryption and decryption system which is automatically installed during the power-on self-test routine and is therefore quite difficult for the user to defeat. The encryption and decryption takes place in direct response to the BIOS level floppy diskette controller interrupt. The encryption and decryption routines are thus automatically invoked at a primitive level below the disk operating system kernel. This has the advantage of automatically encrypting the floppy diskette directory and file allocation table, so that even the manner which information is stored on the diskette is altered so that ordinary diskette copy and directory listing routines will not work. Backup copies on floppy diskette of data stored on the hard disk using disk backup commands will be similarly encrypted. By being specifically attached to the diskette read and write sequence, read and write operations to the hard disk are not affected. Thus the integrity of the data stored on the hard disk is retained.

While the invention has been described in connection with a presently preferred embodiment suitable for installation on an IBM PC/XT and compatibles, the principles of the invention can be implemented on other systems. Furthermore, certain modifications and changes can be made to the system described herein without departing from the spirit of the invention as set forth in the appended claims.

What is claimed is:

1. In a computer system having a fixed data storage medium, a removable data storage medium and a buffer area for communicating with said fixed data storage medium and said removable data storage medium, a data security system comprising:

a selectively invocable nonencrypting operating routine for controlling said removable data storage medium;

a selectively invocable encrypting operating routine for controlling said removable data storage medium;

a power-on self-test routine for automatically enabling said encrypting operating routine and disabling said nonencrypting operating routine upon power up of said computer system;

a security means invoked by said encrypting operating routine and communicating with said buffer area for automatically intercepting and encrypting data flowing from said buffer area to said removable data storage medium for storage on said removable data storage medium in an encrypted state and for intercepting and decrypting data flowing from said removable data storage medium to said buffer area without intercepting and encrypting data flowing from said buffer area to said fixed data storage medium; and a means for testing user input requesting encryption to be disabled and responding to said user input by enabling said nonencrypting operating routine and disabling said encrypting operating routine.

2. The data security system of claim 1 wherein said computer system includes nonvolatile program means for providing instructions whereby data may be transferred between said removable data storage medium and said buffer area and wherein said security means communicates with said nonvolatile program means.

3. The data security system of claim 2 wherein said security means includes encryption program means having means for intercepting control from said nonvolatile program means.

4. The data security system of claim 2 wherein said security means includes encryption program means having means for intercepting control from said nonvolatile program means to effect encryption and having means for thereafter returning control to said nonvolatile program means.

5. The data security system of claim 1 wherein said security means is stored at least in part in nonvolatile memory.

6. The data security system of claim 1 wherein said computer system includes nonvolatile program means for providing instructions whereby data may be transferred between said removable data storage medium and said buffer area and wherein said security means includes decryption program means having means for intercepting control from said nonvolatile program means.

7. The data security system of claim 1 wherein said security means includes decryption program means having means for intercepting control from said nonvolatile program means to effect decryption following the transfer of data from said data storage medium to said buffer area.

8. In a computer system having a processor means for operating on data comprising arrangements of binary digits, means for implementing a power-on routine for causing said processor to scan a predetermined range of memory location addresses for instructions after power-on, means for enabling said processor means to communicate with data storage media comprising program means for reading and writing data to a fixed data storage medium and to a removable data storage medium, a data security system comprising:

security program means disposed within said predetermined range of memory location addresses and providing instructions for causing said processor means to automatically alter said program means for reading and writing during said power-on routine;

said security program means causing data communicated between at least one of said fixed and removable data storage media and said processor means to be altered such that said data stored on said one of said data storage media is represented using a different arrangement of binary digits than is used when said data is operated upon by said processor;

said security program means further including means for testing user input requesting the disabling of security and for responding to said user input by causing data communicated between at least one of said fixed and removable data storage media and said processor means to be communicated without alteration, such that said data stored on said one of said data storage media is represented using the same arrangement, of binary digits as is used when said data is operated upon by said processor.

9. The data security system of claim 8 wherein said security program is stored at least in part in nonvolatile memory.

10. The data security system of claim 8 wherein said security program is stored at least in part in nonvolatile memory in which is also stored at least a portion of said instructions.

11. The data security system of claim 8 wherein said security program includes means for altering said data by bitwise rotation.

12. The data security system of claim 8 wherein said power-on routine comprises at least one computer self-test routine.

13. The data security system of claim 8 wherein said security program causes said processor means to alter said program means for reading and writing at a time during said power-on routine before access to said computer system by external human input may be effected.

* * * * *